United States Patent
Umeno et al.

(10) Patent No.: US 11,881,710 B2
(45) Date of Patent: Jan. 23, 2024

(54) POWER CONVERSION APPARATUS AND POWER CONVERSION SYSTEM

(71) Applicant: TOSHIBA MITSUBISHI-ELECTRIC INDUSTRIAL SYSTEMS CORPORATION, Chuo-ku (JP)

(72) Inventors: Chieko Umeno, Tokyo (JP); Tatsuaki Ambo, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 200 days.

(21) Appl. No.: 17/310,277

(22) PCT Filed: Jul. 2, 2019

(86) PCT No.: PCT/JP2019/026318
§ 371 (c)(1),
(2) Date: Jul. 27, 2021

(87) PCT Pub. No.: WO2021/001931
PCT Pub. Date: Jan. 7, 2021

(65) Prior Publication Data
US 2022/0320863 A1    Oct. 6, 2022

(51) Int. Cl.
*H02J 3/18* (2006.01)
*G05F 1/70* (2006.01)
(Continued)

(52) U.S. Cl.
CPC ............... *H02J 3/18* (2013.01); *G05F 1/70* (2013.01); *H02J 3/381* (2013.01);
(Continued)

(58) Field of Classification Search
CPC .......... H02J 3/18; H02J 3/381; H02J 2300/22; H02M 1/0003; H02M 1/0012; H02M 7/537; G05F 1/70
See application file for complete search history.

(56) References Cited

U.S. PATENT DOCUMENTS

2015/0109836 A1* 4/2015 Hatakeyama ......... H02M 7/537
                                                              363/97
2015/0365014 A1* 12/2015 Lin ......................... H02M 1/44
                                                              363/40
(Continued)

FOREIGN PATENT DOCUMENTS

JP    2017-34739 A    2/2017
JP    2017-118643 A   6/2017
(Continued)

OTHER PUBLICATIONS

Office Action dated Feb. 28, 2022 in corresponding Indian Patent Application No. 202117033286 (with English Translation), 6 pages.
(Continued)

*Primary Examiner* — Jue Zhang
(74) *Attorney, Agent, or Firm* — Oblon, McClelland, Maier & Neustadt, L.L.P.

(57) ABSTRACT

A power conversion system includes plural power conversion apparatuses and a server connected to each of the plural power conversion apparatuses. Each of the plural power conversion apparatuses includes a power conversion circuit interconnected with a power system, a calculating unit configured to calculate, based on an output current and an output voltage of the power conversion circuit, at least one information of reactive power and a reactive current output by the power conversion circuit, a storing unit configured to accumulate, in a storage device, time-series reactive power information which is information associating time and the at least one information calculated by the calculating unit, and
(Continued)

a communication interface configured to transmit the time-series reactive power information stored in the storage device to the server. The server is constructed to collect the time-series reactive power information of each of the plural power conversion apparatuses via the communication interface.

4 Claims, 3 Drawing Sheets

(51) Int. Cl.
  *H02J 3/38* (2006.01)
  *H02M 7/537* (2006.01)
  *H02M 1/00* (2006.01)

(52) U.S. Cl.
  CPC ......... *H02M 1/0003* (2021.05); *H02M 7/537* (2013.01); *H02J 2300/22* (2020.01); *H02M 1/0012* (2021.05)

(56) References Cited

U.S. PATENT DOCUMENTS

2016/0172857 A1  6/2016  Itaya
2019/0148977 A1  5/2019  Kuroda et al.

FOREIGN PATENT DOCUMENTS

| JP | 2017-229110 A | 12/2017 |
| JP | 6457855 B2 | 1/2019 |
| WO | WO 2009/078072 A1 | 6/2009 |
| WO | WO 2015/022724 A1 | 2/2015 |

OTHER PUBLICATIONS

International Preliminary Report on Patentability and Written Opinion dated Sep. 15, 2020 in PCT/JP2019/026318, 23 pages.
International Search Report dated Sep. 10, 2019 in PCT/JP2019/026318 filed on Jul. 2, 2019 (1 page).

\* cited by examiner

FIG. 3

| YEAR, MONTH, DAY | TIME | REACTIVE POWER | | REACTIVE CURRENT | | REACTIVE VOLTAGE | |
|---|---|---|---|---|---|---|---|
| | | INSTANTANEOUS VALUE | INTEGRATED VALUE | INSTANTANEOUS VALUE | INTEGRATED VALUE | INSTANTANEOUS VALUE | INTEGRATED VALUE |
| y/m/d | 10:35:00 | | | | | | |
| y/m/d | 10:35:01 | | | | | | |
| y/m/d | ... | | | | | | |
| y/m/d | ... | | | | | | |
| y/m/d | ... | | | | | | |
| y/m/d | ... | | | | | | |
| y/m/d | 18:35:00 | | | | | | |
| y/m/d | 18:35:01 | | | | | | |
| y/m/d | ... | | | | | | |
| y/m/d | ... | | | | | | |

POWER CONVERSION APPARATUS AND POWER CONVERSION SYSTEM

FIELD

This application relates to a power conversion apparatus and a power conversion system.

BACKGROUND OF INVENTION

As described in, for example, JP2017-118643A, there has been known a control apparatus for inverter control constructed to detect reactive power. As described in paragraph 0034 of this publication, the control apparatus controls reactive power output from a three-level inverter to a power system.

The control apparatus described above includes an inverter control unit. According to paragraph 0046 of this publication, the inverter control unit includes a reactive-power detecting unit. According to paragraph 0049 of this publication, the reactive-power detecting unit is constructed to calculate reactive power based on a formula decided in advance.

CITATION LIST

Patent Literature

[PTL 1] JP2017-118643A

SUMMARY

Technical Problem

In a system interconnected system in a present state, active power is set as a target of a transaction with a power company. It is assumed that, in the future, reactive power is set as a target of a transaction in addition to the active power. The present inventor anticipated such a future prospect and found a new technical configuration that should be mounted on a power conversion apparatus and a power conversion system.

The present application has been devised in order to solve the problem described above and an object of the present application is to provide a power conversion apparatus and a power conversion system with which convenience at the time when a transaction of reactive power is performed is improved.

Solution to Problem

A power conversion apparatus according to the present application includes:
- a power conversion circuit interconnected with a power system;
- a calculating unit that is configured to calculate, based on an output current and an output voltage of the power conversion circuit, at least one information of reactive power and a reactive current output by the power conversion circuit; and
- a storing unit that includes a storage device and is configured to accumulate, in the storage device, time-series reactive power information which is information associating time and the at least one information calculated by the calculating unit.

A power conversion system according to the present application includes:
- a plurality of power conversion apparatuses; and
- a server connected to each of the plurality of power conversion apparatuses,
- wherein each of the plurality of power conversion apparatuses includes:
  - a power conversion circuit interconnected with a power system;
  - a calculating unit that is configured to calculate, based on an output current and an output voltage of the power conversion circuit, at least one information of reactive power and a reactive current output by the power conversion circuit;
  - a storing unit that includes a storage device and is configured to accumulate, in the storage device, time-series reactive power information which is information associating time and the at least one information calculated by the calculating unit; and
  - a communication interface for transmitting the time-series reactive power information stored in the storage device to the server.

Advantageous Effect of Invention

With the power conversion apparatus and the power conversion system according to the present application, it is possible to accumulate time-series data of reactive power in the storing unit. Consequently, it is possible to objectively evaluate a power generation amount when a transaction of the reactive power is performed. Therefore, convenience in performing the transaction of the reactive power is obtained.

BRIEF DESCRIPTION OF DRAWINGS

FIG. 3 is a schematic diagram for explaining time-series reactive power information stored by a storing unit of the power conversion apparatus according to the embodiment.

EMBODIMENT OF INVENTION

Figure 1:
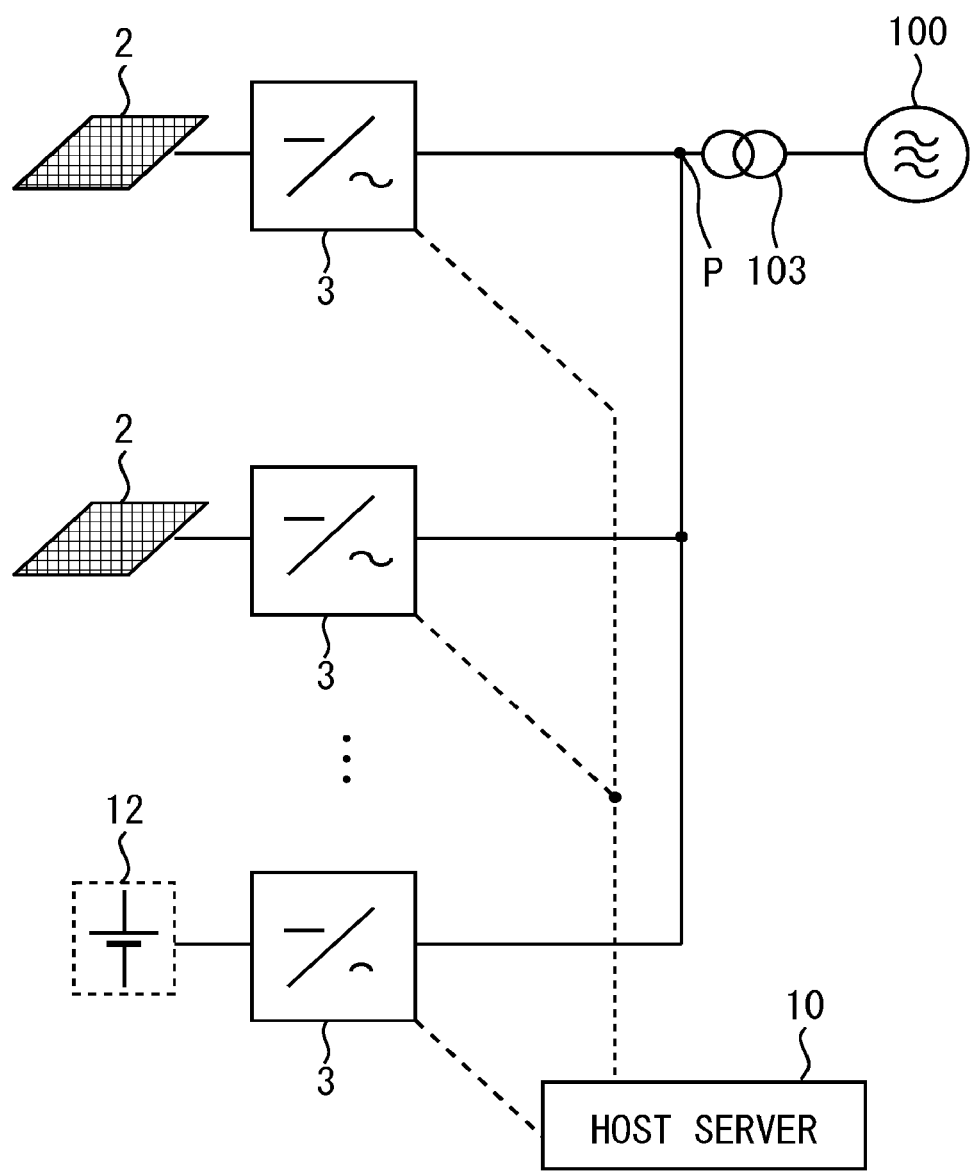
FIG. 1 is a configuration diagram showing a power conversion apparatus and a power conversion system including the power conversion apparatus according to an embodiment.
Figure 2:
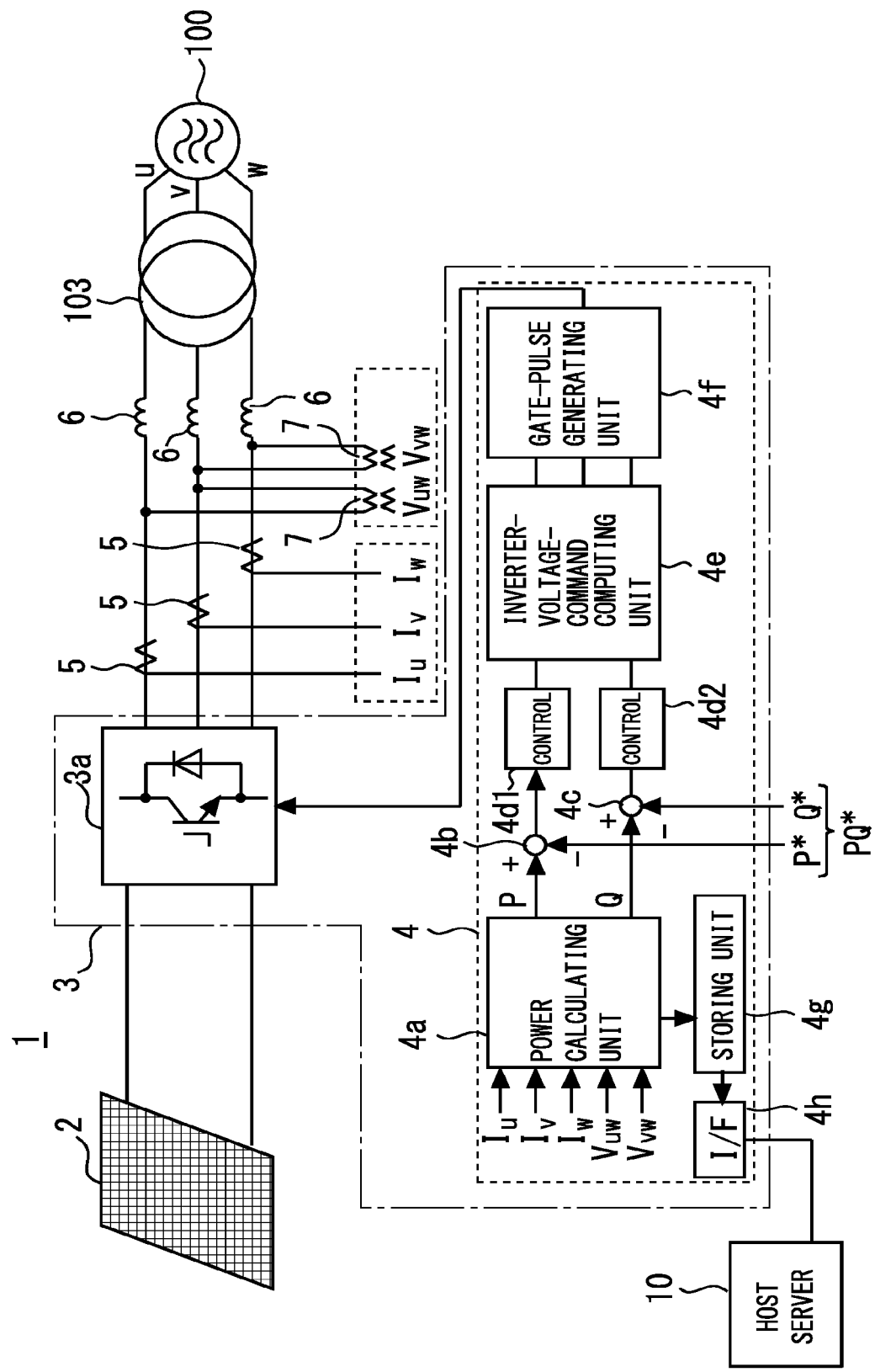
FIG. 2 is a configuration diagram showing the power conversion apparatus and the power conversion system including the power conversion apparatus according to the embodiment.

FIG. 1 and FIG. 2 are configuration diagrams showing a power conversion apparatus 3 and a power conversion system 1 including the power conversion apparatus 3 according to an embodiment. The power conversion system 1 is connected to a power system 100 that transmits three-phase AC power. The power conversion system 1 includes a host transformer 103, a plurality of power conversion apparatuses 3, and a host server 10.

Power generation equipment 2 or battery equipment 12 is connected to an input side of each of the power conversion apparatuses 3. The power generation equipment 2 may include so-called renewable energy power generation equipment 2 such as a solar battery array or a wind power generator. A power generation amount of the renewable energy power generation equipment 2 fluctuates according to weather and hours. The battery equipment 12 may include a storage battery (a secondary battery) or may include a fuel battery. The battery equipment 12 may include a storage battery main body and a battery management unit (BMU) that manages a state of the storage battery main body.

The host server 10 is connected to each of the plurality of power conversion apparatuses 3 via a communication transmission line. In the case of a power generation plant in which a large number of power conversion apparatuses 3 and a solar battery array are set, the host server 10 may be a PPC (power plant controller) that collectively controls the plurality of power conversion apparatuses 3. In the case of a power generation plant in which only one power conversion apparatus 3 is set, the host server 10 does not always have to be the PPC and may be replaced with any monitoring apparatus. The host server 10 includes a host storage device having a fixed capacity. "Time-series reactive power information" explained below is collected and accumulated in the host storage device.

FIG. 2 is a detailed configuration diagram for explaining the configuration of one power conversion apparatus 3 in the power conversion system 1 according to the embodiment. In FIG. 2, the power conversion apparatus 3 connected to the power generation equipment 2 is illustrated. The power conversion apparatus 3 connected to the battery equipment 12 has the same structure.

The power conversion system 1 includes the power generation equipment 2, the power conversion apparatus 3, a plurality of current transformers 5, a plurality of instrument transformers 7, a plurality of reactors 6, and the host transformer 103.

The power conversion apparatus 3 includes a power conversion circuit 3a and a power conversion control circuit 4. The power conversion circuit 3a in the embodiment is an inverter circuit that inverts DC power into AC power. As an example, the power conversion circuit 3a may be a voltage-type three-phase inverter circuit.

The power conversion control circuit 4 includes a power calculating unit 4a, an active-power subtracting unit 4b, a reactive-power subtracting unit 4c, an active-power control unit 4d1, a reactive-power control unit 4d2, an inverter-voltage-command computing unit 4e, a gate-pulse generating unit 4f, a storing unit 4g, and a communication interface 4h.

The power calculating unit 4a acquires a voltage measurement value via the plurality of instrument transformers 7 and acquires a current measurement value via the plurality of current transformers 5. The current measurement value includes three-phase output currents Iu, Iv, and Iw of the power conversion circuit 3a. The voltage measurement value includes interphase output voltages Vuw and Vvw.

The power calculating unit 4a calculates an active power measurement value and a reactive power measurement value respectively based on the acquired voltage measurement value and the acquired current measurement value. The reactive power measurement value calculated by the power calculating unit 4a includes at least one information of reactive power and a reactive current output by the power conversion circuit 3a. As a calculation method for various power parameters including active power, an active current, a reactive current, and reactive power, publicly-known various calculation methods are already known. The calculation method is not a new technique. Therefore, explanation about details of the calculation method is omitted.

The power conversion control circuit 4 receives a command value PQ* from a command-value generating unit (not illustrated). The command value PQ* includes an active power command value P* and a reactive power command value Q*.

The active-power subtracting unit 4b computes a difference between the active power measurement value P from the power calculating unit 4a and the active power command value P*. The reactive-power subtracting unit 4c computes a difference between the reactive power measurement value Q from the power calculating unit 4a and the reactive power command value Q*.

The active-power control unit 4d1 carries out publicly-known feedback control on an output value of the active-power subtracting unit 4b. The reactive-power control unit 4d2 carries out the publicly-known feedback control on an output value of the reactive-power subtracting unit 4c. For the feedback control, any one of PI control, P control, and PID control can be used.

The inverter-voltage-command computing unit 4e generates voltage command values for three phases based on the active power command value from the active-power control unit 4d1 and the reactive power command value of the reactive-power control unit 4d2. The gate-pulse generating unit 4f generates a PWM signal for gate driving to a switching element of the power conversion circuit 3a based on the voltage command values for three phases from the inverter-voltage-command computing unit 4e.

The plurality of current transformers 5 are respectively provided in three-phase output side wires of the power conversion circuit 3a. Electric currents of respective three phases (that is, a U phase, a V phase, and a W phase) can be measured based on current signals converted by the plurality of current transformers 5. The plurality of instrument transformers 7 are respectively provided in the three-phase output side wires of the power conversion circuit 3a. Voltages among the three phases can be measured via the plurality of instrument transformers 7.

The plurality of reactors 6 are interposed between respective three-phase AC sides of the power conversion circuit 3a and the host transformer 103. The host transformer 103 is interposed between the reactors 6 and the power system 100. However, this system configuration is an example. The reactors 6 and the host transformer 103 are a so-called interconnected reactor or an interconnected transformer. One of the reactors 6 and the host transformer 103 could be omitted.

The storing unit 4g includes a storage device. The storing unit 4g accumulates "time-series reactive power information" in the storage device. The "time-series reactive power information" is information associating the at least one information calculated by the power calculating unit 4a with time. The storing unit 4g accumulates the time-series reactive power information over a predetermined time length decided in advance. The predetermined time length is preferably length equal to or longer than one day including the daytime and the night. This is because a difference could occur in electric power selling prices between the daytime and the night.

The storage device included in the storing unit 4g may be a nonvolatile memory. The nonvolatile memory may be a flash memory such as a USB flash drive or an SD memory card. The storage device included in the storing unit 4g may be a large-capacity storage device or, specifically, may be an SSD (solid state drive) or a hard disk drive. The host storage device included in the host server 10 explained above may have a storage capacity larger than a storage capacity of storage device included in each of the power conversion apparatuses 3.

The communication interface 4h transmits the time-series reactive power information stored in the storage device of the storing unit 4g to the host server 10. The communication transmission line between the communication interface 4h and the host server 10 may be constructed by, for example, an optical fiber communication cable but is not limited to this. All wireless and wired communication transmission lines may be used.

The command-value generating unit that generates the command value PQ* in the embodiment may be a host control apparatus that host-controls the power conversion apparatus 3 in the power conversion system 1. In the embodiment, as an example, the command-value generating unit may be a so-called main site controller (MSC) or may be a PPC. In this case, the command-value generating unit and the host server 10 may be realized by the same hardware.

As shown in FIG. 1, several of the power conversion apparatuses 3 may be connected to the battery equipment 12. In order to perform charging and discharging of the battery equipment 12, the power conversion control circuit 4 includes a charging control mode and a discharging control mode. The power conversion control circuit 4 can selectively execute the "charging control mode" and the "discharging control mode" according to content of the command value PQ*.

The charging control mode is a mode for controlling the power conversion circuit 3*a* to take electric power into the battery equipment 12 from the side of the reactor 6 via the power conversion circuit 3*a*. The discharging control mode is a mode for controlling the power conversion circuit 3*a* to discharge electric power of the battery equipment 12 from the battery equipment 12 to the side of the reactor 6 via the power conversion circuit 3*a*.

In the embodiment, a value of each of reactive power and a reactive current injected into the system from the power conversion apparatus 3 is recorded in the storing unit 4*g* provided in the power conversion apparatus 3. First, a signal acquired via the current transformer 5 and the instrument transformer 7 is transmitted to the power conversion control circuit 4. When the acquired signal is transmitted to a current sensor circuit and a voltage sensor circuit inside the power conversion apparatus 3, a system output current Is and a system voltage Vs are detected.

The power calculating unit 4*a* calculates, based on the system output current Is and the system voltage Vs, a reactive current and reactive power output to the system side by the power conversion apparatus 3. Calculation values include both of instantaneous values and integrated values. The storing unit 4*g* records the instantaneous value and the integrated value of the reactive current and the instantaneous value and the integrated value of the reactive power in association with time. This recorded electronic data is the "time-series reactive power information". Note that it is set in advance over which degree of a period the storing unit 4*g* stores the integrated values.

The power conversion control circuit 4 transmits the time-series reactive power information recorded in the storing unit 4*g* to the host server 10 according to necessity. A communication frequency between the power conversion control circuit 4 and the host server 10 can be variously decided. For example, the power conversion control circuit 4 may automatically transmit the time-series reactive power information to the host server 10 periodically at a period decided in advance. The power conversion control circuit 4 may transmit the time-series reactive power information to the host server 10 every time in response to a request signal from the host server 10. Alternatively, the transmission of the time-series reactive power information may be real-time processing in which the time-series reactive power information is instantaneously communicated every time data is generated.

FIG. 3 is a schematic diagram for explaining the time-series reactive power information stored by the storing unit 4*g* of the power conversion apparatus 3 according to the embodiment. Specifically, the time-series reactive power information includes, as shown in FIG. 3, year, month, and day, time, the instantaneous value of the reactive power, the integrated value of the reactive power, the instantaneous value of the reactive current, and the integrated value of the reactive current. It is preferable that all of these kinds of information are stored in association with time as shown in FIG. 3. However, as a modification, only one kind of information or a plurality of kinds of information among the instantaneous value of the reactive power, the integrated value of the reactive power, the instantaneous value of the reactive current, and the integrated value of the reactive current may be recorded. A sampling period of data to be stored may be, for example, an interval of one second, may be an interval of a very short time shorter than one second, or may be an interval of a short time of approximately several seconds longer than one second. Note that the recording of the reactive power may be recording for distinguishing and recording delayed reactive power and advanced reactive power.

As explained above, with the power conversion apparatus 3 according to the embodiment, the time-series reactive power information can be accumulated as a history in the storing unit 4*g* in a form of electronic data. Therefore, it is possible to perform objective evaluation when a transaction of reactive power is performed.

Modifications described below may be provided in the embodiment. As one of the modifications, the storing unit 4*g* may be constructed to execute accident storage processing. The accident storage processing is processing for accumulating, over a period decided in advance in association with time, accident related information concerning output power of the power conversion circuit 3*a* at an accident occurrence time. The accident storage processing and the recording processing for the time-series reactive power information according to the embodiment may be individually mounted on the power conversion control circuit 4. In this case, the storing unit 4*g* may accumulate, separately from the accident related information, the time-series reactive power information over a longer period or a shorter period than an accumulation period for the accident related information.

REFERENCE SIGNS LIST

1 Power conversion system
2 Power generation equipment
3 Power conversion apparatus
3*a* Power conversion circuit
4 Power conversion control circuit
4*a* Power calculating unit
4*b* Active-power subtracting unit
4*c* Reactive-power subtracting unit
4*d*1 Active-power control unit
4*d*2 Reactive-power control unit
4*e* Inverter-voltage-command computing unit
4*f* Gate-pulse generating unit
4*g* Storing unit
4*h* Communication interface
5 Current transformer
6 Reactor
7 Instrument transformer
10 Host server
12 Battery equipment
100 Power system
103 Host transformer

The invention claimed is:

1. A power conversion apparatus comprising:
   a power conversion circuit interconnected with a power system;
   a calculating unit that is configured to calculate, based on an output current and an output voltage of the power conversion circuit, at least one information of reactive power and a reactive current output by the power conversion circuit; and
   a storing unit that includes a storage device and is configured to accumulate, in the storage device, time-series reactive power information which is information associating time and the at least one information calculated by the calculating unit,
   wherein the time-series reactive power information is information further associating year, month, and day with the time and the at least one information calculated by the calculating unit,
   wherein the at least one information includes information associating, with the time, each of an instantaneous value and an integrated value with respect to each of the reactive power, the reactive current, and a reactive voltage output by the power conversion circuit.

2. A power conversion system comprising:
   a plurality of power conversion apparatuses; and
   a server connected to each of the plurality of power conversion apparatuses,
   wherein each of the plurality of power conversion apparatuses includes:
   a power conversion circuit interconnected with a power system;
   a calculating unit that is configured to calculate, based on an output current and an output voltage of the power conversion circuit, at least one information of reactive power and a reactive current output by the power conversion circuit;
   a storing unit that includes a storage device and is configured to accumulate, in the storage device, time-series reactive power information which is information associating time and the at least one information calculated by the calculating unit; and
   a communication interface that is configured to transmit the time-series reactive power information stored in the storage device to the server,
   wherein the time-series reactive power information is information further associating year, month, and day with the time and the at least one information calculated by the calculating unit,
   wherein the at least one information includes information associating, with the time, each of an instantaneous value and an integrated value with respect to each of the reactive power, the reactive current, and a reactive voltage output by the power conversion circuit.

3. The power conversion system according to claim 2, wherein the power conversion system is configured to not include a wind power generator.

4. The power conversion system according to claim 3, wherein the power conversion system is constructed in a form of any one of a system in which power generation equipment includes only a solar battery array, a system in which power generation equipment includes only a storage battery, and a system in which power generation equipment includes only solar power generation and a storage battery.

* * * * *